United States Patent [19]
Curnow et al.

[11] 3,787,027
[45] Jan. 22, 1974

[54] POWER TRANSMISSION

[75] Inventors: John W. Curnow, Utica; Harry J. Nowicki, Mt. Clemens, both of Mich.

[73] Assignee: Sperry Rand Corporation, Troy, Mich.

[22] Filed: Oct. 16, 1972

[21] Appl. No.: 298,106

[52] U.S. Cl.................. 251/63, 91/452, 137/492.5, 137/494
[51] Int. Cl. ......................................... F16k 31/143
[58] Field of Search ... 251/63; 137/492.5, 494, 495; 91/420, 452

[56] References Cited
UNITED STATES PATENTS
2,020,773   11/1935   Ernst..................................... 251/63
2,208,820   7/1940   Tarris et al. ....................... 251/63 X
2,255,787   9/1941   Kendrick ........................... 91/420 X Primary Examiner—Henry T. Klinksiek
Attorney, Agent, or Firm—Theodore Van Meter

[57] ABSTRACT

A valve for automatic stabilization of hydraulic motor speed under varying motor loads is arranged to bypass a small flow around the principal motor speed regulating valve, which small flow is increased with the motor inlet pressure. This compensates for the cross-port leakage in the motor which varies with motor load. The inner parts of the valve may be selectively assembled in various positions to provide various maximum flow openings so that hydraulic motors of various sizes may be effectively stabilized.

4 Claims, 9 Drawing Figures

POWER TRANSMISSION

The U.S. Pat. to Douglas No. 2,004,522 discloses a hydraulic system in which the varying cross-port leakage of a hydraulic motor is compensated by a pressure responsive valve which bypasses variable amounts of fluid around the main speed controlling orifice. The range of cross-port leakage which such valves may accommodate is relatively limited so that a single valve design cannot effectively stabilize more than a very limited size range of hydraulic motors. This has heretofore necessitated a range of stabilizing valve sizes substantially as great as the range of motor sizes to be stabilized.

It is an object of the present invention to provide a single valve design which can effectively stabilize any hydraulic motor within a very wide range of sizes.

This is accomplished by the provision of a valve comprising a body having a longitudinal bore closed at opposite ends, first and second lateral ports opening to the bore at longitudinally spaced locations, the first port communicating with the bore through slots of limited circumferential width, a spool slidable in the bore having a land to normally close communication between the ports, tapered grooves in the land adapted to register with the slots in the bore when the spool is shifted longitudinally to establish communication between the ports, piston means at one end of the bore for shifting the spool, spring means at the opposite end of the bore to bias the spool toward closed position, means forming a sliding key and keyway between the spool and the bore to maintain rotational register between the slots and the grooves, and means for establishing a plurality of positions of register to provide a plurality of maximum flow rates when the spool is fully shifted to open position.

IN THE DRAWINGS

FIG. 1 is a hydraulic circuit diagram showing in section a valve incorporating a preferred form of the present invention.

Figure 2:
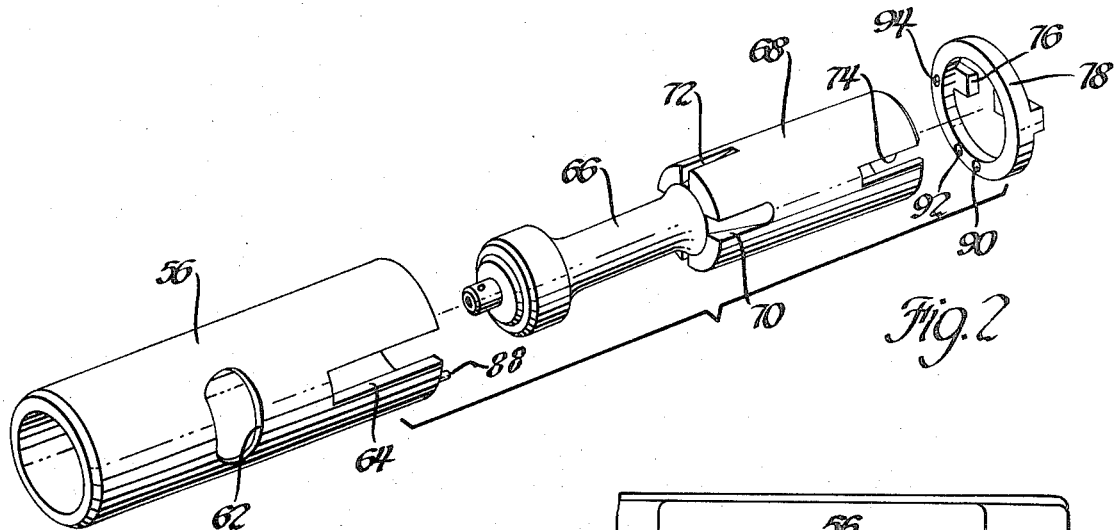
FIG. 2 is an exploded view of parts of the internal valve mechanism.
Figure 4:
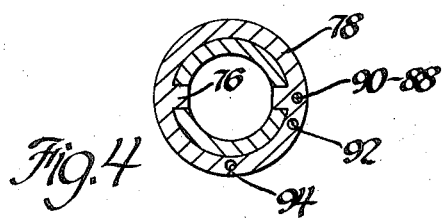
FIG. 4 is a partial cross section on line 3—3 of FIG. 1 with the parts positioned for greatest maximum flow.
Figure 3:
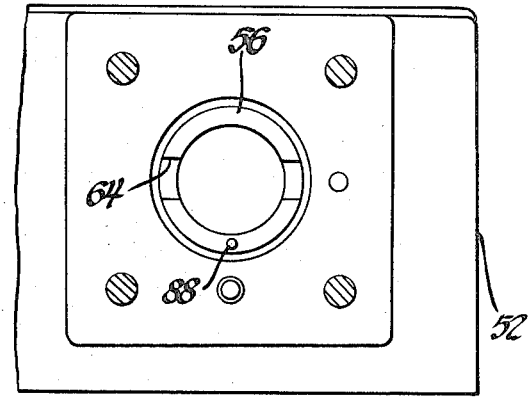
FIG. 3 is a cross section on line 3—3 of FIG. 1, with one of the parts removed.
Figure 5:
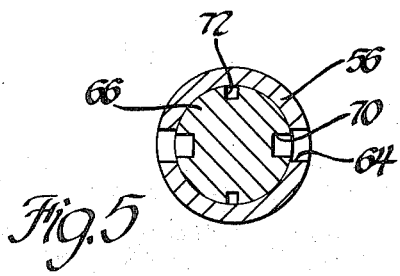
FIG. 5 is a partial cross section on line 5—5 of FIG. 1 with the parts in position for greatest maximum flow.
Figure 6:
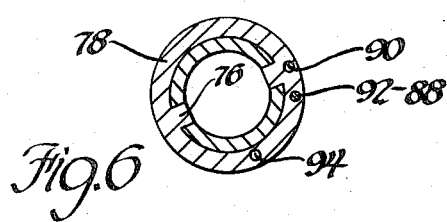
Figure 7:
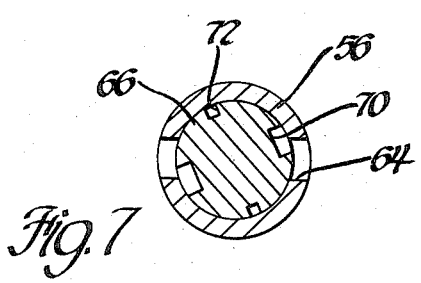

FIGS. 6 and 7 correspond to FIGS. 4 and 5, but with the parts in position for medium maximum flow.

Figure 8:
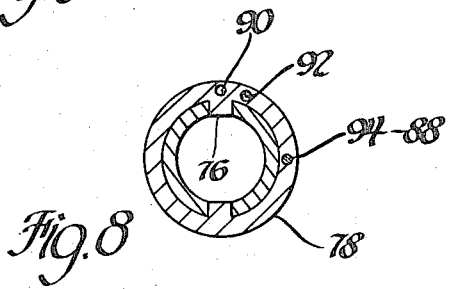
Figure 9:
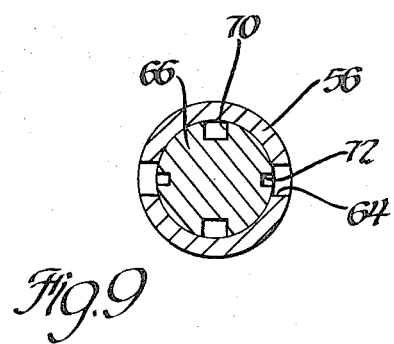

FIGS. 8 and 9 correspond with FIGS. 4 and 5, but with the parts in position for the smallest maximum flow.

Figure 1:
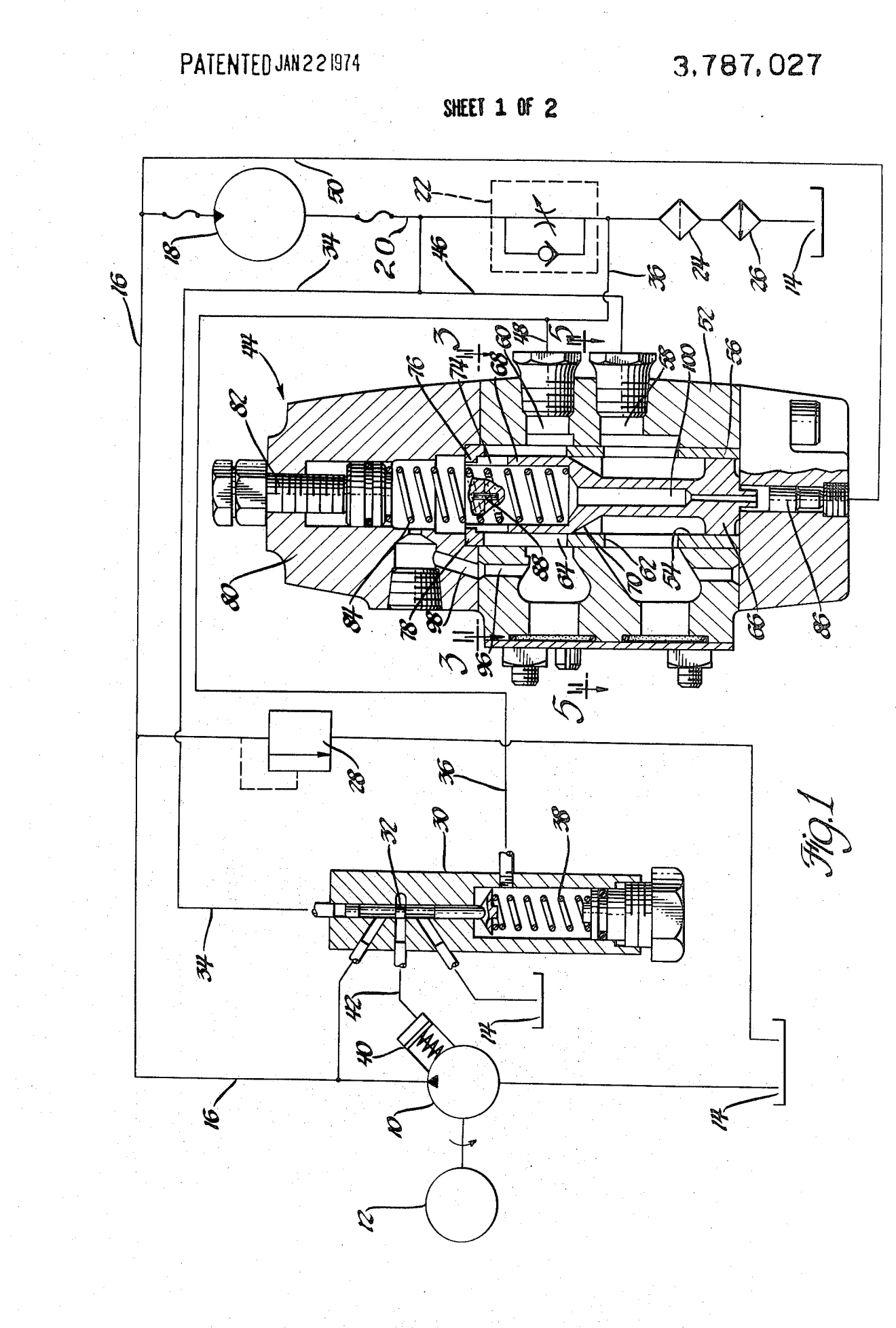

In FIG. 1, a variable displacement pump 10 driven by an electric motor 12 withdraws hydraulic fluid from a tank 14 and delivers it through a delivery line 16 to a fixed displacement hydraulic motor 18. The motor discharge line 20 leads to a manually adjustable orifice valve 22 which discharges through filter 24 and heat exchanger 26 to the tank 14. The delivery line pressure is limited to a predetermined maximum by the usual overload relief valve 28.

The displacement of the pump 10 is automatically regulated so as to maintain a constant pressure drop across the orifice 22. This is accomplished by a three-way pilot valve 30, the spool 32 of which is exposed at its upper end through line 34 to pressure upstream of the orifice 22 and at its lower end through line 36 to pressure downstream of the orifice 22. A spring 38 biases the spool 32 sufficiently to maintain a predetermined small pressure drop across orifice 22. Valve 30 controls the displacement of pump 10 through a spring biased servomotor 40 by admitting or exhausting fluid to it through the line 42.

The parts thus far described would be adequate to maintain the speed of the motor 18 at any constant value determined by the setting of the orifice 22, except that the cross-port leakage, sometimes referred to as the slip through the motor, varies with variations in load. To compensate for this variable slip and thus stabilize motor speed at all load conditions, a valve 44 is connected in parallel with the orifice valve 22 through lines 46 and 48 and is sensitive to pressure in the delivery line 16 through a sensing line 50.

The valve 44 has a body 52 with a central bore 54 which is formed by a sleeve 56 pressed into the body. Lateral ports 58 and 60 communicate between the bore 54 and the connecting lines 46 and 48. Port 58 includes a pair of large holes 62 in the sleeve 56 while port 60 includes a pair of longitudinal slots 64 in the sleeve 56. Slidable within the bore 54 is a spool 66 having a land 68 which, in the position illustrated, blocks communication between ports 58 and 60. The land 68 has a pair of tapered grooves 70 which, when the spool is raised, can register with the slots 64. A similar but smaller pair of grooves 72 are located 90° away from the grooves 70.

The spool 68 contains at its upper end a pair of keyways 74 which slidably engage a pair of keys 76 formed in a locating ring 78. The locating ring 78 is positioned between the upper end of the body 52 and an end cap 80 which contains an adjusting screw 82 for a biasing spring 84 which urges the spool 66 downwardly in opposition to delivery line pressure acting on a small piston 86. The locating ring 78 may be selectively positioned in any one of several arcuately spaced positions by means of a pin 88 which may be received in any one of three holes 90, 92 or 94 in the ring 78. Passageways 96 and 98 in the body and the end cap and passage 100 in the spool serve to drain the bottom of the bore 54 to the outlet port 60 and the downstream side of the orifice 22.

In operation with the system filled with fluid and pump 10 driven by the motor 12, at a given setting of the orifice 22 the speed of the motor 18 at no load will be determined by the biasing force of the spring 38 in valve 30 which will maintain a displacement setting of the pump 10 such as to maintain a constant pressure drop across the orifice 22 and thus a constant flow therethrough. At no load on the motor 18, the cross-port leakage or slip will be minimal. As the load on the motor increases, however, the pressure in delivery line 16 will correspondingly increase and be transmitted through line 50 to the small piston 86, thus raising the spool 66 against spring 84 and starting to open communication from port 58 through grooves 70 and slots 64 into port 60. This allows a small amount of additional flow to take place around the orifice 22 which, if it is equal in amount to the cross port leakage at that particular delivery line pressure, will prevent the motor speed from falling below its no-load speed. In adjusting to this new condition, the pilot valve 30 will act to slightly increase the displacement of pump 10 by a corresponding amount.

The degree to which the stablizing valve 44 opens under any given delivery line pressure can be adjusted over a small range by adjusting the screw 82 and thus changing the bias of spring 84 upon the spool 66. This, however, is insufficient to accommodate more than a very limited range of values of motor cross-port leakage. A much wider range of cross-port leakage values may be accommodated by shifting the rotational position of the groove 70 relative to the slots 64 as may be seen from FIG. 7 where the circumferential arc of register between the slots and grooves is considerably smaller than the full register position illustrated in FIG. 5. This position of FIG. 7 is achieved by reassembling the parts with the locating ring positioned with its hole 92 in engagement with the pin 88. To achieve a still smaller range of cross-port leakage accommodation, the locating ring 78 may be positioned as shown in FIG. 8 with the hole 94 engaged with the pin 88. This positions the grooves 72 in register with the slots 64 for an even smaller arc of registration. In any of the three assembled positions just described, the valve may be adjusted to accommodate exactly the cross port leakage of a particular motor by adjustment of the screw 82 and spring 84. In this way, the increments of flow through the valve 44 which result from predetermined increments of delivery line pressure may be precisely adjusted over a much wider range than would be possible if only one arc of register between the grooves in the spool and the slot in the body were available.

We claim:

1. A valve for automatic stabilization of hydraulic motor speed under varying load conditions comprising a body having a longitudinal bore closed at opposite ends, first and second lateral ports opening to the bore at longitudinally spaced locations, the first port communicating with the bore through slots of limited circumferential width, a spool slidable in the bore having a land to normally close communication between the ports, tapered grooves in the land adapted to register with the slots in the bore when the spool is shifted longitudinally to establish communication between the ports, piston means at one end of the bore for shifting the spool, spring means at the opposite end of the bore to bias the spool toward closed position, means forming a sliding key and keyway between the spool and the bore to maintain rotational register between the slots and the grooves, and means for establishing a plurality of positions of register to provide a plurality of maximum flow rates when the spool is fully shifted to open position.

2. A valve as defined in claim 1 wherein the bore is formed by a sleeve in the body, the sleeve having longitudinal slots adjacent the first port.

3. A valve as defined in claim 2 wherein a locating member has a sliding keyed relation with the spool and a plurality of selective keyed relations with the body.

4. A valve as defined in claim 3 wherein the locating member is a ring positioned between the body and an end cap removably attached to the body.

* * * * *